US011967471B2

(12) United States Patent
Tanihara et al.

(10) Patent No.: US 11,967,471 B2
(45) Date of Patent: Apr. 23, 2024

(54) ELECTRICAL CONTACT AND VACUUM SWITCH TUBE COMPRISING ELECTRICAL CONTACT

(71) Applicant: Mitsubishi Electric Corporation, Tokyo (JP)

(72) Inventors: Yasutomo Tanihara, Tokyo (JP); Hiroyuki Chibahara, Tokyo (JP); Taiki Donen, Tokyo (JP); Satoshi Ochi, Tokyo (JP); Yuichi Takai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 215 days.

(21) Appl. No.: 17/628,226

(22) PCT Filed: Aug. 27, 2019

(86) PCT No.: PCT/JP2019/033417
§ 371 (c)(1),
(2) Date: Jan. 19, 2022

(87) PCT Pub. No.: WO2021/038706
PCT Pub. Date: Mar. 4, 2021

(65) Prior Publication Data

US 2022/0254577 A1 Aug. 11, 2022

(51) Int. Cl.
*H01H 1/025* (2006.01)
*H01H 11/04* (2006.01)
*H01H 33/664* (2006.01)

(52) U.S. Cl.
CPC .......... *H01H 1/025* (2013.01); *H01H 11/048* (2013.01); *H01H 33/664* (2013.01); *H01H 2201/03* (2013.01)

(58) Field of Classification Search
CPC .... H01H 1/025; H01H 1/0233; H01H 1/0203; H01H 1/0206; H01H 2201/03; H01H 11/048; H01H 33/664
(Continued)

(56) References Cited

U.S. PATENT DOCUMENTS 4,499,009 A * 2/1985 Yamanaka ........... H01H 1/0203 200/266
2010/0270267 A1* 10/2010 Noda ...................... C22C 27/06 218/123
(Continued)

FOREIGN PATENT DOCUMENTS

JP 60-211717 A 10/1985
JP 2001-236865 A 8/2001
(Continued)

OTHER PUBLICATIONS

International Search Report and Written Opinion dated Nov. 5, 2019, received for PCT Application PCT/JP2019/033417, Filed on Aug. 27, 2019, 9 pages including English Translation.

*Primary Examiner* — William A Bolton
(74) *Attorney, Agent, or Firm* — XSENSUS LLP

(57) ABSTRACT

The present disclosure aims to provide an electrical contact to which a low boiling point metal is added, the electrical contact being able secure both mechanical strength and conductivity at the same time. The electrical contact according to the present disclosure includes a base material made of Cu, particles of a high melting point substance dispersed in the base material, the particles being made of at least one of a high melting point metal or a carbide of the high melting point metal, and Te and Ti dispersed in the base material, wherein, the Te of 3.5 to 14.5 mass % is added where the total is 100 mass %, and Ti/Te is 0.12 to 0.38.

7 Claims, 11 Drawing Sheets

(58) Field of Classification Search
USPC .......................... 218/118, 123, 130, 132, 146
See application file for complete search history.

(56) References Cited

U.S. PATENT DOCUMENTS

| | | | | |
|---|---|---|---|---|
| 2014/0076852 A1* | 3/2014 | Kikuchi | H01H 1/0206 218/130 |
| 2014/0079584 A1* | 3/2014 | Simon | H01H 33/664 428/404 |
| 2015/0048054 A1* | 2/2015 | Karkada | H01H 1/0233 29/875 |
| 2015/0069020 A1* | 3/2015 | Steinwandel | H01H 1/025 427/451 |
| 2016/0078976 A1* | 3/2016 | Chou | H01H 1/025 428/647 |
| 2016/0247648 A1* | 8/2016 | Campbell | H01H 33/662 |
| 2019/0051475 A1* | 2/2019 | Chibahara | B22F 7/00 |
| 2020/0277688 A1 | 9/2020 | Tanihara et al. | |

FOREIGN PATENT DOCUMENTS

| | | | |
|---|---|---|---|
| JP | 2007-123053 | A | 5/2007 |
| JP | 2007-332429 | A | 12/2007 |
| JP | 2010-86898 | A | 4/2010 |
| JP | 2012-4076 | A | 1/2012 |
| JP | 2014-56784 | A | 3/2014 |
| JP | 6497491 | B1 | 4/2019 |

* cited by examiner

FIG. 2

| | Cu [wt%] | Cr [wt%] | Ti [wt%] | Te [wt%] | Ti/Te [wt% ratio] | Form of Te compound | Infiltration Temperature [°C] | Contact manufacturability | Low chopping current characteristics | Breaking characteristics @4kA |
|---|---|---|---|---|---|---|---|---|---|---|
| Working Example 1 | 66.1 | 30 | 0.45 | 3.5 | 12.9% | TiTe compound | 1120 | Pass | Pass | Pass |
| Working Example 2 | 65.9 | 30 | 0.6 | 3.5 | 17.1% | TiTe compound | 1120 | Pass | Pass | Pass |
| Working Example 3 | 65.5 | 30 | 1 | 3.5 | 28.6% | TiTe compound | 1130 | Pass | Pass | Pass |
| Working Example 4 | 65.2 | 30 | 1.3 | 3.5 | 37.1% | TiTe compound | 1140 | Pass | Pass | Pass |
| Comparative Example 1 | 66.2 | 30 | 0.3 | 3.5 | 8.6% | CuTe compound | 1110 | Fail | Fail | Fail |
| Comparative Example 2 | 65 | 30 | 1.5 | 3.5 | 42.9% | TiTe compound | 1150 | Fail | Fail | Fail |
| Comparative Example 3 | 66.8 | 30 | 0.7 | 2.5 | 28.0% | TiTe compound | 1130 | Pass | Fail | Pass |

FIG. 3

| | Cu [wt%] | Cr [wt%] | Ti [wt%] | Te [wt%] | Ti/Te [wt% ratio] | Form of Te compound | Infiltration Temperature [°C] | Contact manufacturability | Low chopping current characteristics | Breaking characteristics @4kA |
|---|---|---|---|---|---|---|---|---|---|---|
| Working Example 5 | 59.9 | 30 | 1.1 | 9 | 12.2% | TiTe compound | 1120 | Pass | Pass | Pass |
| Working Example 6 | 59.4 | 30 | 1.6 | 9 | 17.8% | TiTe compound | 1120 | Pass | Pass | Pass |
| Working Example 7 | 59 | 30 | 2 | 9 | 22.2% | TiTe compound | 1130 | Pass | Pass | Pass |
| Working Example 8 | 58.4 | 30 | 2.6 | 9 | 28.9% | TiTe compound | 1130 | Pass | Pass | Pass |
| Working Example 9 | 57.7 | 30 | 3.3 | 9 | 36.7% | TiTe compound | 1140 | Pass | Pass | Pass |
| Comparative Example 4 | 60.2 | 30 | 0.8 | 9 | 8.9% | CuTe compound | 1110 | Fail | Fail | Fail |
| Comparative Example 5 | 57.2 | 30 | 3.8 | 9 | 42.2% | TiTe compound | 1150 | Fail | Fail | Fail |

FIG. 4

| | Cu [wt%] | Cr [wt%] | Ti [wt%] | Te [wt%] | Ti / Te [wt% ratio] | Form of Te compound | Infiltration Temperature [°C] | Contact manufacturability | Low chopping current characteristics | Breaking characteristics @4kA |
|---|---|---|---|---|---|---|---|---|---|---|
| Working Example 10 | 53.7 | 30 | 1.8 | 14.5 | 12.4% | TiTe compound | 1120 | Pass | Pass | Pass |
| Working Example 11 | 53 | 30 | 2.5 | 14.5 | 17.2% | TiTe compound | 1120 | Pass | Pass | Pass |
| Working Example 12 | 51.2 | 30 | 4.3 | 14.5 | 29.7% | TiTe compound | 1130 | Pass | Pass | Pass |
| Working Example 13 | 50.3 | 30 | 5.2 | 14.5 | 35.9% | TiTe compound | 1140 | Pass | Pass | Pass |
| Comparative Example 6 | 54.2 | 30 | 1.3 | 14.5 | 9.0% | CuTe compound | 1110 | Fail | Fail | Fail |
| Comparative Example 7 | 49.5 | 30 | 6 | 14.5 | 41.4% | TiTe compound | 1150 | Fail | Fail | Fail |
| Comparative Example 8 | 51 | 30 | 3.5 | 15.5 | 22.6% | TiTe compound | 1130 | Pass | Fail | Fail |

FIG. 9

| | Cu [wt%] | Cr [wt%] | Ti [wt%] | Te [wt%] | Ti/Te [wt% ratio] | Form of Te compound | Infiltration Temperature [°C] | Contact manufacturability | Low chopping current characteristics | Breaking characteristics @4kA |
|---|---|---|---|---|---|---|---|---|---|---|
| Working Example 14 | 68.4 | 20 | 2.6 | 9 | 28.9% | TiTe compound | 1130 | Pass | Pass | Pass |
| Working Example 15 | 38.4 | 50 | 2.6 | 9 | 28.9% | TiTe compound | 1130 | Pass | Pass | Pass |
| Working Example 16 | 28.4 | 60 | 2.6 | 9 | 28.9% | TiTe compound | 1130 | Pass | Pass | Pass |
| Comparative Example 9 | 73.4 | 15 | 2.6 | 9 | 28.9% | TiTe compound | 1130 | Pass | Pass | Fail |
| Comparative Example 10 | 18.4 | 70 | 2.6 | 9 | 28.9% | TiTe compound | — | Fail | Fail | Fail |

FIG. 10

| | Cu [wt%] | Cr [wt%] | Ti [wt%] | Te [wt%] | Cr Particle diameter [µm] | Form of Te compound | Infiltration Temperature [°C] | Contact manufacturability | Low chopping current characteristics | Breaking characteristics @4kA |
|---|---|---|---|---|---|---|---|---|---|---|
| Working Example 17 | 38.4 | 50 | 2.6 | 9 | 1 | TiTe compound | 1130 | Pass | Pass | Pass |
| Working Example 18 | 38.4 | 50 | 2.6 | 9 | 40 | TiTe compound | 1130 | Pass | Pass | Pass |
| Working Example 19 | 38.4 | 50 | 2.6 | 9 | 120 | TiTe compound | 1130 | Pass | Pass | Pass |
| Comparative Example 11 | 38.4 | 50 | 2.6 | 9 | 0.1 | TiTe compound | — | Fail | Fail | Fail |
| Comparative Example 12 | 38.4 | 50 | 2.6 | 9 | 150 | TiTe compound | 1130 | Fail | Fail | Fail |

FIG. 11

| | Cu [wt%] | Arc resistant component [wt%] | | Ti [wt%] | Te [wt%] | Ti/Te [wt% ratio] | Cr Particle diameter [μm] | Form of Te compound | Infiltration Temperature [°C] | Contact manufacturability | Low chopping current characteristics | Breaking characteristics @4kA |
|---|---|---|---|---|---|---|---|---|---|---|---|---|
| Working Example 20 | 38.4 | W | 50 | 2.6 | 9 | 28.9% | 1 | TiTe compound | 1130 | Pass | Pass | Pass |
| Working Example 21 | 38.4 | $Cr_3C_2$ | 50 | 2.6 | 9 | 28.9% | 40 | TiTe compound | 1130 | Pass | Pass | Pass |
| Working Example 22 | 38.4 | WC | 50 | 2.6 | 9 | 28.9% | 120 | TiTe compound | 1130 | Pass | Pass | Pass |

ELECTRICAL CONTACT AND VACUUM SWITCH TUBE COMPRISING ELECTRICAL CONTACT

CROSS-REFERENCE TO RELATED APPLICATION

The present application is based on PCT filing PCT/JP2019/033417, filed Aug. 27, 2019, the entire contents of which are incorporated herein by reference.

TECHNICAL FIELD

The present disclosure relates to a vacuum switch tube for a vacuum circuit breaker, which belongs among high voltage power distribution equipment, an electrical contact for the vacuum switch tube, and a manufacturing method for the electrical contact.

BACKGROUND ART

A vacuum circuit breaker installed in high voltage power distribution equipment is used to break a current in the event of a failure or an anomaly in the high voltage power distribution equipment. The vacuum circuit breaker includes a vacuum switch tube that has a function to break current. The vacuum switch tube has a structure in which a fixed electrode and a movable electrode are arranged coaxially so as to face each other in an insulated container kept in high vacuum.

When an overload current or a short-circuit current occurs in the power distribution equipment, the contact between the electrodes is instantly opened by moving the movable electrode away from the fixed electrode to break the current. However, since an arc is generated between the electrodes, the current is not broken instantly after the contact is opened. When an AC current is broken, the arc is weakened as the AC current decreases, and the break is established when the arc disappears. A phenomenon in which the current is momentarily broken before the AC current becomes zero is called current chopping.

During the current chopping, a large surge voltage called a switching surge occurs. If an apparatus connected to the power distribution equipment has capacitive or inductive nature, the apparatus connected thereto may be damaged by a large surge voltage that is to be generated. In order to lower the surge voltage, it is necessary to reduce a chopping current, which is the current flowing at the time when the current chopping occurs. Reduction of the chopping current can be achieved by sustaining the arc generated between the electrodes during the contact opening, nearly to the zero point of the AC current.

The sustainment of the arc depends on the number of particles present in the vacuum. Therefore, in order to sustain the arc, it is necessary to supply particles into the vacuum during the current chopping. There are two types of particles to be supplied: metal particles and thermions. As a conventional electrical contact material having low chopping current characteristics, a mixture of Ag, being a conductive component, with a high melting point metal, or with a carbide of a high melting point metal, such as WC, is selected. This is because electrode heating caused by the generated arc promotes evaporation of Ag being a conductive component and thermionic emission of the high melting point metal or the carbide of the high melting point metal, and thus the arc is sustained.

According to Richardson Dashman's equation, which shows a current density for the thermionic emission capacity, it is known that the thermionic emission capacity depends on the work function and the temperature of the material. In particular, the contribution of the temperature is large. Therefore, the high melting point metal and the carbide of the high melting point metal are widely used owing to their high melting points. From the above perspective, a vacuum switch tube using an Ag-WC electrical contact, which exhibits excellent low chopping current characteristics, has been developed and put into practical use.

In the conventional vacuum switch tube, stable low chopping current characteristics are obtained by adding, for example, Te or Se to an electrical contact material using Cu instead of Ag, as a conductive component, from a low-cost perspective (see, for example, Patent Document 1 and Patent Document 2). This is because Te and Se are low boiling point metals whose boiling points are very low among metals, and thus the electrode heating by arc irradiation causes a large amount of the low boiling point metals to evaporate, thereby making it possible to sustain the arc.

Although the low chopping current characteristics can be achieved by adding a low boiling point metal, the selective evaporation of the low boiling point metal, however, can also be regarded as material consumption of the electrical contact.

Therefore, as the number of times of opening and closing of the contact increases, the low boiling point metal is consumed, the amount of the metal vapor supplied to the space between the electrical contacts is decreased, and, as a result, the low chopping current characteristics are deteriorated. Therefore, in order to suppress the deterioration of the low chopping current characteristics, it is conceivable to increase the amount of the low boiling point metal to be added. However, if Te, which is the low boiling point metal, is added excessively to the electrical contact, $Cu_2Te$, which is an intermetallic compound of Te and Cu, is generated, and thus the electrical contact becomes fragile. In view of this, by adding an appropriate amount of Mn, the mechanical strength of the electrical contact is secured (see, for example, Patent Document 3).

CITATION LIST

Patent Document

Patent Document 1: Japanese Patent Application Laid-open No. 2014-56784

Patent Document 2: Japanese Patent Application Laid-open No. 2007-332429

Patent Document 3: Japanese Patent No. 6497491

SUMMARY OF INVENTION

Problems to be Solved by Invention

However, whereas the mechanical strength is secured, Mn and Cu forms solid solution with each other, and thus the conductivity of the electrical contact decreases, which causes a problem that the temperature of the vacuum switch tube to which the electrical contact is applied rises when the vacuum switch tube is energized.

The present disclosure is made to solve the problem described above and an object is to provide an electrical contact in which a low boiling point metal is added and both mechanical strength and conductivity are secured at the same time without using Mn.

Means for Solving Problems

An electrical contact according to the present disclosure includes a base material made of Cu, particles of a high melting point substance dispersed in the base material, the particles being made of at least one of a high melting point metal or a carbide of the high melting point metal, and Te and Ti dispersed in the base material, wherein, the Te of 3.5 to 14.5 mass % is added where the total is 100 mass %, and Ti/Te is 0.12 to 0.38, and at least part of the Te and at least part of the Ti form an intermetallic compound of the Te and the Ti.

A vacuum switch tube according to the present disclosure comprises an electrical contact that includes, a base material made of Cu, particles of a high melting point substance dispersed in the base material, the particles being made of at least one of a high melting point metal or a carbide of the high melting point metal, and Te and Ti dispersed in the base material, wherein, the Te of 3.5 to 14.5 mass % is added where the total is 100 mass %, and Ti/Te is 0.12 to 0.38, and at least part of the Te and at least part of the Ti form an intermetallic compound of the Te and the Ti.

Effect of Invention

According to the electrical contact of the present disclosure, regarding the composition of Ti and Te, Te is 3.5 to 14.5 mass %, and Ti/Te is 0.12 to 0.38. As a result, both the mechanical strength and the conductivity can be secured without adding Mn.

According to the vacuum switch tube with the electrical contact of the present disclosure, regarding the composition of Ti and Te, Te has 3.5 to 14.5 mass %, and Ti/Te is 0.12 to 0.38. As a result, both the mechanical strength and the conductivity can be secured without adding Mn.

According to the manufacturing method for the electrical contact of the present disclosure, regarding the mixing ratio of a Ti powder and a Te powder, the Te powder of 3.5 to 14.5 mass % is mixed, and Ti/Te is 0.12 to 0.38. As a result, it is possible to manufacture an electrical contact in which the mechanical strength and the conductivity are secured.

BRIEF DESCRIPTION OF DRAWINGS

FIG. 2 is a table showing compositions of electrical contacts of Working Examples 1 to 4 according to Embodiment 1 of the present disclosure and Comparative Examples 1 to 3.

FIG. 3 is a table showing compositions of electrical contacts of Working Examples 5 to 9 according to Embodiment 1 of the present disclosure and Comparative Examples 4 to 5.

FIG. 4 is a table showing compositions of electrical contacts of Working Examples 10 to 13 according to Embodiment 1 of the present disclosure and Comparative Examples 6 to 8.

FIG. 9 is a table showing compositions of electrical contacts of Working Examples 14 to 16 according to Embodiment 1 of the present disclosure and Comparative Examples 9 to 10.

FIG. 10 is a table showing compositions of electrical contacts of Working Examples 17 to 19 according to Embodiment 1 of the present disclosure and Comparative Examples 11 to 12.

FIG. 11 is a table showing compositions of electrical contacts of Working Examples 20 to 22 according to Embodiment 1 of the present disclosure.

MODES FOR CARRYING OUT INVENTION

Embodiment 1

Figure 1:
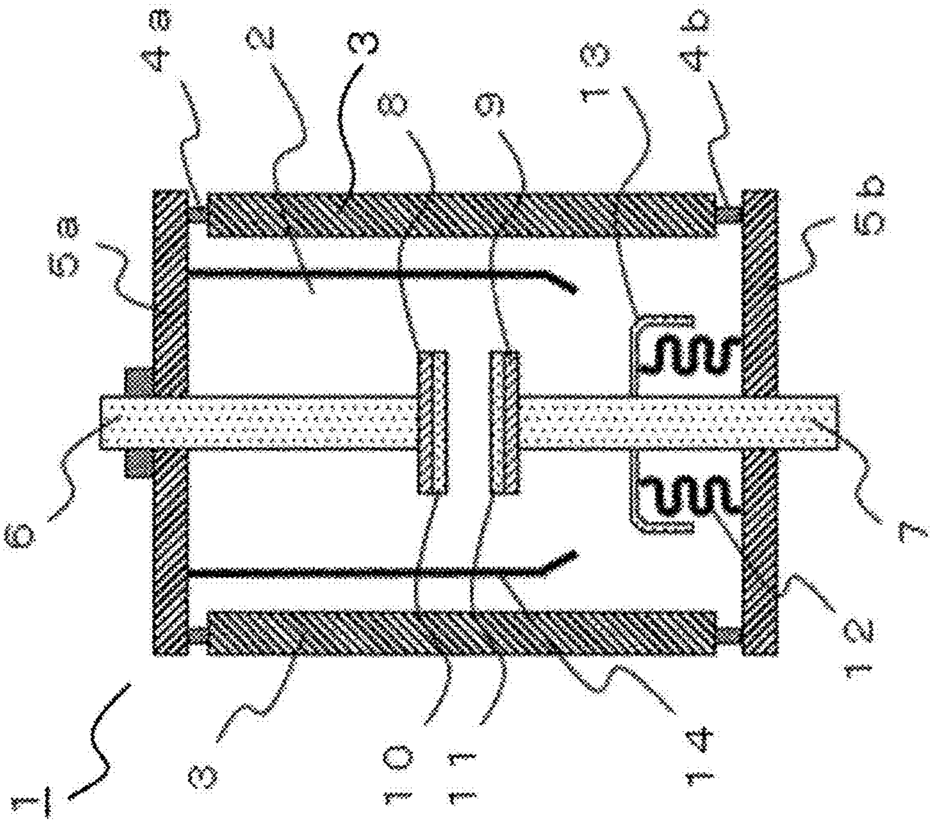
FIG. 1 is a schematic cross-sectional view of a vacuum switch tube according to Embodiment 1 of the present disclosure.

FIG. 1 is a schematic cross-sectional view of a vacuum switch tube according to Embodiment 1. The vacuum switch tube 1 of the present embodiment includes a breaking chamber 2. The breaking chamber 2 includes a cylindrical insulated container 3 and metal covers 5*a* and 5*b*. Both ends of the metal covers 5*a* and 5*b* are fixed by sealing metal fittings 4*a* and 4*b*, and the inside of the metal covers 5*a* and 5*b* is kept vacuum and airtight. In the breaking chamber 2, a fixed electrode rod 6 and a movable electrode rod 7 are mounted opposite to each other. A fixed electrode 8 and a movable electrode 9 are attached to the end portions of the fixed electrode rod 6 and the movable electrode rod 7 by brazing, respectively. In addition, a fixed electrical contact 10 and a movable electrical contact 11 are attached to the contact parts of the fixed electrode 8 and the movable electrode 9 by brazing, respectively. For at least one of the fixed electrical contact 10 and the movable electrical contact 11, the electrical contact according to the present embodiment is used.

A bellows 12 is attached to the movable electrode rod 7. The bellows 12 allows the movable electrode 9 to move in the axial direction while keeping the inside of the breaking chamber 2 vacuum and airtight. The movement of the movable electrode 9 in the axial direction causes the movable electrode 9 to come into contact with or separate away from the fixed electrode 8. On the top of the bellows 12, a metal arc shield for bellows 13 is provided. The arc shield for bellows 13 prevents arc steam from adhering to the bellows 12. Further, a metal arc shield 14 for the insulated container is provided in the breaking chamber 2 so as to cover the fixed electrode 8 and the movable electrode 9. The arc shield 14 for the insulated container prevents arc steam from adhering to the inner wall of the insulated container 3.

Generally, the fixed electrode 8 and the movable electrode 9 as well as the fixed electrical contact 10 and the movable electrical contact 11 have a disc shape. In the following description, it is assumed that the electrical contacts in the present embodiment are disc shaped.

First, a manufacturing method for the electrical contact according to the present embodiment will be described. The electrical contact of the present embodiment is manufactured through the following steps, a step of mixing raw material powders and pressing the mixed powder using a predetermined press die to form a molded body, a step of calcining the molded body to obtain a sintered body, a step of infiltrating Cu into the obtained sintered body to obtain an infiltrated body, and a step of machining the obtained infiltrated body into a predetermined shape to obtain the electrical contact. Hereinafter, the manufacturing method for the electrical contact according to the present embodiment will be described in detail.

In the step of mixing raw material powders and pressing the mixed powder using a predetermined press die to form a molded body, a Cu powder as a base material for a conductive component, a Cr powder as a high melting point metal to be an arc resistant component, and a Ti powder and a Te powder as low boiling point metals for sustaining the arc are mixed, and then the resulting mixed powder is pressed and formed into a shape using a pressing machine, thereby obtaining a Cu—Cr—Ti—Te molded body. When the mass of the mixed powder is 100 mass % (hereinafter referred to as wt %), the powders are mixed such that the mass of the Ti powder is 20 to 80 wt %, the mass of the Te powder is 3.5 to 14.5 wt %, and the mass of the Cu powder and the Cr powder is the rest. In this case, Ti/Te is 0.12 to 0.38 in mass ratio. The experiments conducted to determine the value for each of the above substances will be described later.

When a powder such as a Cr particle that is relatively hard and is not deformed plastically becomes finer, the specific surface area of the powder is larger, which makes it difficult to densify the powder in the case of press molding because there are many voids near the contact points between the powders. If the particle diameter is minute, the press molding pressure for obtaining a molded body having a desired density becomes too high, and cracks may occur during the press molding. Therefore, it is desirable that the average particle diameter of the Cr powder is larger than 0.1 μm. In addition, however, when the average particle diameter of the Cr powder is large, variation occurs at the time of breaking, and thus the low chopping current characteristics may become unstable. Therefore, it is desirable that the average particle diameter of the Cr powder should be 120 μm or smaller.

For the average particle diameter of the raw material powders, for example, the average particle diameter in the particle size distribution measured by a laser-diffraction-type particle-size distribution measurement device is adopted.

In the step of calcining the molded body to obtain the sintered body, the Cu—Cr—Ti—Te molded body is sintered at 500 to 950 degrees Celsius under hydrogen atmosphere or under vacuum of $1\times10^{-5}$ Pa or lower. The sintering temperature should be at least 30 degrees Celsius lower than 988 degrees Celsius, which is the boiling point of Te.

In the step of obtaining the infiltrated body by infiltrating Cu into the sintered body, a Cu disk or a Cu square plate with a size equal to or smaller than the sintered body is placed directly under the sintered body under hydrogen atmosphere or under vacuum of $1\times10^{-5}$ Pa or lower, and then the infiltration is performed at a temperature of 1083 degrees Celsius, which is the melting point of Cu, or higher, and not higher than 1140 degrees Celsius. When the temperature during the infiltration is 1140 degrees Celsius or higher, the following problems may occur: Te sublimation, which starts when saturated vapor pressure among the low boiling point metals existing in the sintered body becomes high, causes the sintered body to expand, and thus a dense electrical contact cannot be obtained; or Cu in the sintered body melts, and thus the shape of the sintered body collapses.

As for the arrangement, the Cu disk or the Cu square plate may be under the sintered body and vice versa. Alternatively, the sintered body may be sandwiched between two of the Cu disks from top and bottom. In the step of machining the infiltrated body into a desired shape to obtain an electrical contact, the contact material is ground until it has a thickness and a diameter required in design as the fixed electrical contact or the movable electrical contact for the vacuum switch tube. Finally, an electrical contact can be obtained by applying taper processing or surface polishing to the end portion.

In the step of machining the infiltrated body into a predetermined shape to obtain an electrical contact, the contact material is ground until it has a thickness and a diameter required in design as the fixed electrical contact or the movable electrical contact for the vacuum switch tube. Finally, an electrical contact can be obtained by applying taper processing or surface polishing to the end portion. Next, Working Examples and Comparative Examples will be given and described in more detail.

Working Example 1

In Working Example 1, a Cu powder with an average particle diameter of 10 μm, a Cr powder with an average particle diameter of 40 μm, a Te powder with an average particle diameter 40 μm, and a Ti powder with an average particle diameter of 30 μm were mixed for 30 minutes or longer using a ball mill or a V-type powder mixer or the like to make a uniformly mixed powder. The mixed powder was placed in a steel die having an inner diameter φ of 23 mm and was compression molded at a pressure of 20 to 100 MPa using a hydraulic press machine to form a molded body having a thickness of 5 mm.

The obtained molded body was sintered at 900 degrees Celsius for two hours under hydrogen atmosphere to obtain a sintered body. Then, the sintered body was placed on a Cu disk with a thickness of about 2 mm and a diameter φ of 20 mm and the infiltration was performed at 1110 degrees Celsius for two hours under hydrogen atmosphere to obtain an electrical contact of Working Example 1. When the infiltrant Cu was not melted, the temperature was raised in steps by 10 degrees Celsius and the infiltration treatment was performed again. The temperature at which Cu melts during the infiltration treatment is defined as an infiltration temperature. The composition of the electrical contact obtained in Working Example 1 is shown in the table in FIG. 2.

Working Examples 2 to 13

In Working Examples 2 to 13, electrical contacts were fabricated in the same steps as in Working Example 1 and the effect of Ti concentration was verified. Note that the composition ratio in the electrical contact was changed by adjusting the mass ratio of each powder when mixed powders were made. In Working Examples 2 to 4, with Te concentration fixed at 3.5 wt %, the compositions of the electrical contacts are shown in the table in FIG. 2. In Working Examples 5 to 9, with Te concentration fixed at 9 wt %, each of the compositions of the electrical contacts obtained is shown in the table in FIG. 3. In Working Examples 10 to 13, with Te concentration fixed at 14.5 wt %, each of the compositions of the electrical contacts is shown in the table in FIG. 4.

Comparative Examples 1 to 8

In Comparative Examples 1 to 8, electrical contacts were fabricated in the same steps as in Working Example 1 and the effect of Ti concentration was verified. Note that the mass ratio of each powder was adjusted to change the composition ratios of the electrical contacts when mixed powders were made. Te concentrations were fixed as follows: at 3.5 wt % in Comparative Examples 1 and 2; at 2.5 wt % in Comparative Example 3; at 9 wt % in Comparative Examples 4 and 5; at 14.5 wt % in Comparative Example 6 and 7; and at 15.5 wt % in Comparative Example 8. The compositions of the electrical contacts in Comparative Examples 1 to 3 are shown in FIG. 2, the compositions of the electrical contacts in Comparative Examples 4 and 5 are shown in FIG. 3, and the compositions of the electrical contacts in Comparative Examples 6 to 8 are shown in FIG. 4.

In the present embodiment, Working Examples 1 to 13 and Comparative Examples 1 to 8 were evaluated from the perspectives of manufacturability, low chopping current characteristics, and breaking characteristics. In addition, whether their conductivities are satisfactory or not was verified. Description will be made in detail in due order.

First, a description will be made on the manufacturability. The manufacturability is evaluated in terms of whether electrical contacts can be manufactured. There are two evaluation points for the manufacturability of electrical contacts. The first evaluation point is whether the density ratio of an electrical contact exceeds 95%, which is a usable density ratio as an electrical contact. In the present embodiment, the density ratio is defined as the ratio of the density of a prototype electrical contact to the theoretical density calculated from the compounding composition. If the density ratio is 95% or lower, there may be voids in the electrical contact. In the brazing process during the vacuum switch tube assembly, these voids in the electrical contact absorb the brazing material by capillarity, thereby possibly increasing the frequency of brazing defects. Therefore, in practice, a density ratio exceeding 95% is desirable, and an electrical contact whose density ratio does not reach 95% is judged to be defective.

The second evaluation point is that the electrical contact fabricated by the infiltration treatment has a mechanical strength to an extent to allow the electrical contact to be cut out into a predetermined shape by machining. An electrical contact with less mechanical strength is regarded as a good electrical contact since the weldability is fine. However, if the mechanical strength is excessively low, cracks occur during machining, thereby making the machining difficult. Therefore, a mechanical strength at least at a level not to cause cracking during the machining is required. In the present embodiment, the case where no crack occurred during machining was judged as a pass, and the case where cracks occurred was judged as a failure.

Next, the evaluation of the low chopping current characteristics and the breaking characteristics will be described. The evaluation of the low chopping current characteristics and the breaking characteristics is based on the results of chopping current tests and breaking current tests using, as test contacts, the electrical contacts obtained in each of Working Examples and Comparative Examples. The test contacts with a thickness of 3 mm and a diameter φ of 20 mm were fabricated by machining the electrical contacts with a thickness 5 mm and a diameter φ of 23 mm obtained in each of Working Examples and Comparative Examples. Further, taper processing for making an about 15 degrees taper angle with respect to the surface of each test contact was performed in the end portion from the edge up to 2 mm inside thereof. Two test contacts after the taper processing were fabricated, and a vacuum switch tube for evaluation was assembled using one of them for the fixed contact and the other for the movable contact. Using the vacuum switch tubes for evaluation prepared according to each of Working Examples and Comparative Examples, the chopping current tests and the breaking current tests were conducted to evaluate the low chopping current characteristics and the breaking characteristics.

In the chopping current tests, a circuit was prepared, in which a 20Ω resistor and a vacuum switch tube for evaluation were connected in series, and a 10 A current was caused to flow the circuit using an AC 200 V power supply. When the contacts of the vacuum switch tube for evaluation were opened from their closed state, the current just before the arc current becomes zero was measured. The measured current was defined as chopping current. The chopping current tests were conducted 1000 times using the same vacuum switch tube for evaluation, and the average value of the measured chopping current values was registered as the chopping current value of each of Working Examples and Comparative Examples. Note that the chopping current value must be 1 A or lower in order to avoid the damage to a connected electric apparatus due to the increase in surge voltage that occurs at the time of breaking. In these tests, if the chopping current value was 1 A or lower, the test was passed.

In the break tests, a circuit was prepared, in which a thyristor and a vacuum switch tube for evaluation were connected in series, and an energizing current generated using the discharge from a capacitor bank was caused to flow the circuit with the contacts of the vacuum switch tube for evaluation closed. Then, when the contacts of the vacuum switch tube for evaluation were opened, the pass/fail of the test was judged based on whether or not the current can be normally broken. The capacitor bank was charged by an external power source. The break tests were conducted by incrementing the energizing current by 1 kA, starting from 2 kA, and when the break test was finished at 4 kA, the pass/fail of the break test was judged. The pass of the break test means that neither recurrence nor continuation of the arc occurs when the contacts of the vacuum switch tube for evaluation are opened.

Next, the evaluation of the conductivity of the fabricated electrical contacts will be described. Since the electrical contacts are current-carrying members, high conductivity is required. For the standard of the electrical conductivity, the international annealed copper standard (IACS), in which the volume resistivity of internationally-adopted annealed standard copper: $1.7241\times10^{-2}$ μΩm is defined as 100% IACS, is used. In the present embodiment, the conductivity of an Ag-WC contact which is widely used as a low surge contact was set as the criterion, and if the conductivity was higher than 20% IACS, the test was passed.

Figure 5:
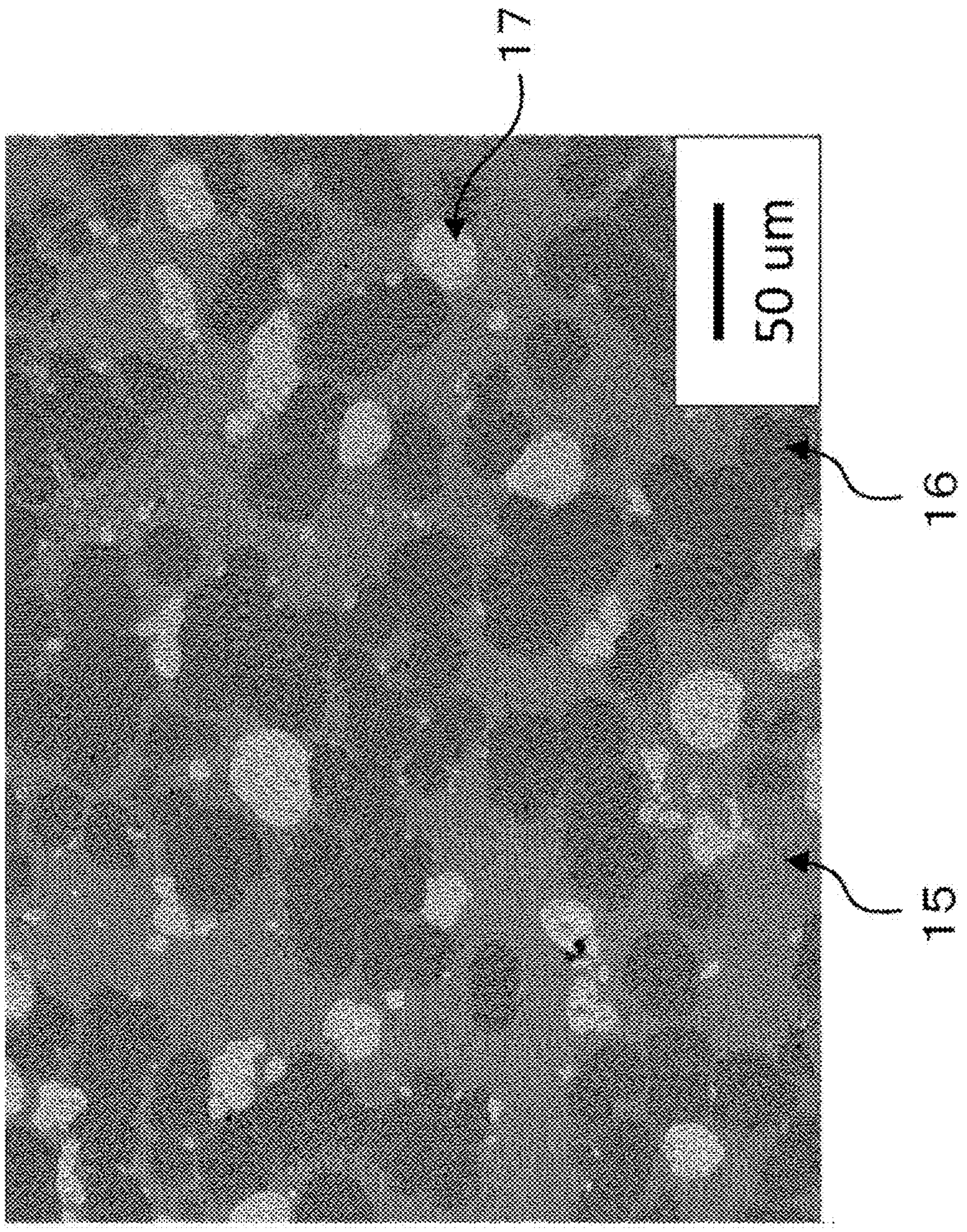
FIG. 5 is a cross-sectional view showing an internal compositional structure of an electrical contact fabricated in Working Example 3 according to Embodiment 1 of the present disclosure.

FIG. 5 is a cross-sectional view showing the internal compositional structure of an electrical contact fabricated in Working Example 3 of the present embodiment. FIG. 5 is a cross-sectional photograph of the electrical contact observed using a scanning electron microscope (SEM). The compositional distribution of the internal structure was measured using the compositional analysis function, enabled by wavelength-dispersive X-ray spectroscopy or energy-dispersive X-ray spectroscopy, included in the scanning electron microscope. As shown in FIG. 5, in a base material 15 with Cu as a conductive component, Cr particles 16, which are particles of a high melting point substance, and Ti—Te intermetallic-compound particles 17, which are particles of an intermetallic compound made from Ti and Te, are dispersed.

Figure 6:
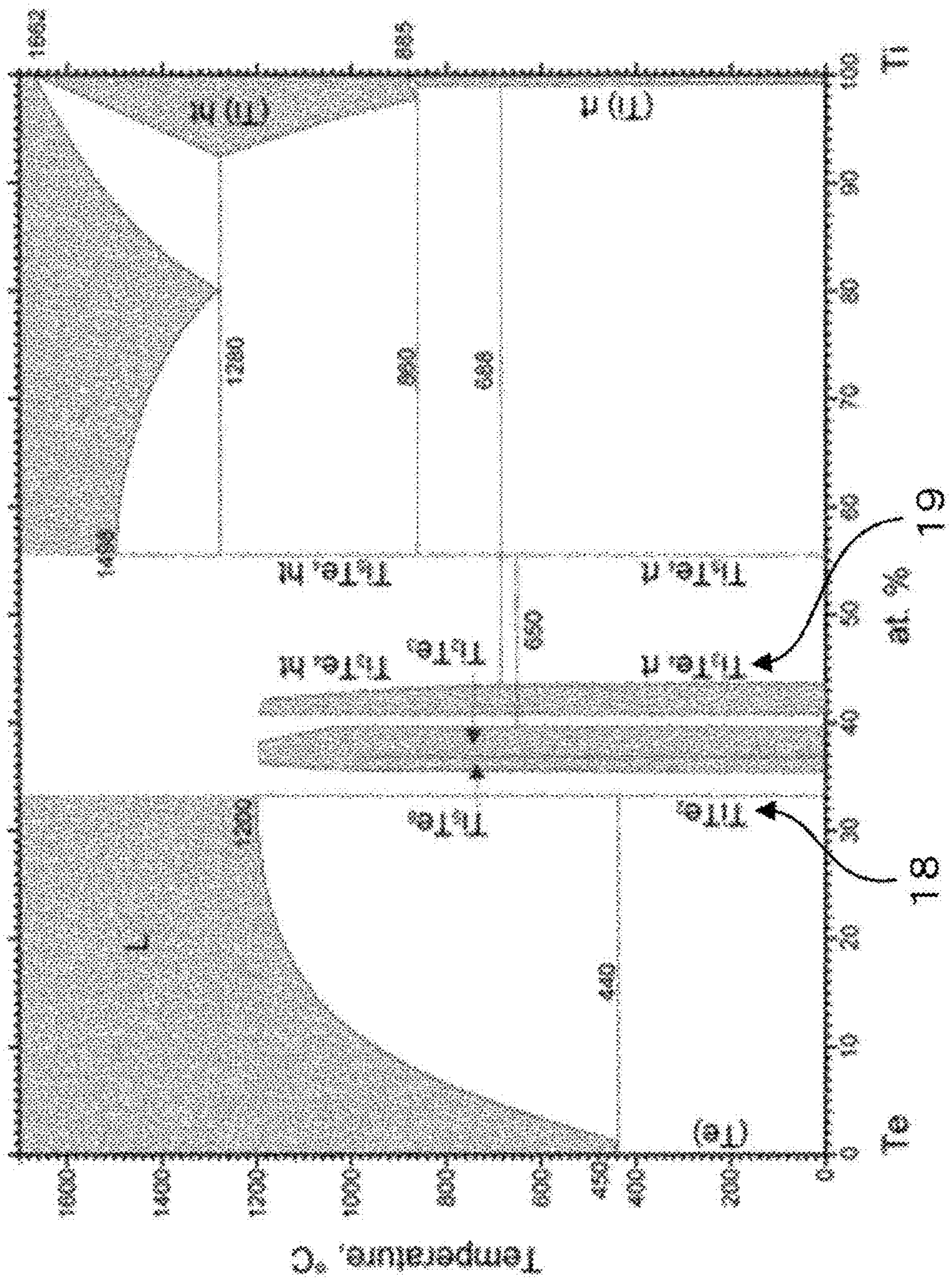
FIG. 6 is a Ti—Te state diagram according to Embodiment 1 of the present disclosure.

The compositional distribution of the internal structure of the Ti—Te intermetallic-compound particles 17 was measured using the compositional analysis function, enabled by wavelength-dispersive X-ray spectroscopy or energy-dispersive X-ray spectroscopy, attached to the SEM. From the measurement result, it was found that the ratio of the number of atoms of Ti and Te was 1:2 or 3:4. FIG. 6 is a Ti—Te state diagram of the electrical contact shown in FIG. 5. From FIG. 6, it can be seen that, among the Ti—Te intermetallic compounds, a $TiTe_2$ intermetallic compound 18 or a $Ti_3Te_4$ intermetallic compound 19 is contained. From this, it is considered that in the process of mixing and heating the Ti powder and the Te powder, they reacted with each other to form the intermetallic compounds.

In order to maintain the mechanical strength that enables the machining of the electrical contact, Ti was added in an amount that would not lead to formation of $Cu_2Te$, which is a cause of the fragility of the electrical contact. In order to make the Ti—Te intermetallic-compound particles 17, the ratio of the number of atoms of Ti:Te=1:2 or 3:4 is desired, and then Ti/Te by the ratio of the number of atoms should be 0.5 or higher. Therefore, it can be said that Ti/Te by mass ratio should be 0.17 or higher. In the following, description will be made using mass ratio.

The results of Working Examples 1 to 13 and Comparative Examples 1 to 8 are described in due order. First, Working Examples 1 to 4 and Comparative Examples 1 to 2 will be described referring to FIG. 2. In the perspective of the density ratio relating to the manufacturability, in Working Examples 1 to 4 and Comparative Example 1, prototypes of the electrical contact were able to be fabricated because Cu infiltrates before the infiltration temperature of 1140 degrees Celsius is reached. In the perspective of the mechanical strength relating to the manufacturability, when the samples of Working Examples 1 to 4 and Comparative Example 1 were machined, some cracks occurred in Comparative Example 1. In Comparative Example 2, the infiltrant Cu remains almost uninfiltrated and the density ratio of the sample does not reach 95%, it was impossible to manufacture an electrical contact.

From the above results, it was found that the value of Ti/Te in the formation of the $TiTe_2$ intermetallic compound or the $Ti_3Te_4$ intermetallic compound needs to be at least 0.12 or more, instead of at least 0.17 or more. From the Ti—Te state diagram in FIG. 6, it can be inferred from the principle of leverage that $TiTe_2$ intermetallic compound is formed even when Ti/Te is 0.17 or less. In other words, it is considered that, not all the Te needs to become the $TiTe_2$ intermetallic compound or the $Ti_3Te_4$ intermetallic compound, but if a certain amount of the Ti—Te intermetallic compounds is contained, the electrical contact can have mechanical strength to an extent that avoids breakage thereof. In Working Examples, since cracks occurred when Ti/Te was 0.09 or lower, it can be said that the fabrication was possible even when Ti/Te was 0.12 or higher.

In a cross-sectional analysis of Comparative Example 1 with Ti/Te of 0.09 or lower, a large number of $Cu_2Te$ particles, which is a cause of fragility, was detected. It is considered that this is because the amount of Ti for making the Ti—Te intermetallic compound is insufficient. In Working Examples 1 to 4, satisfactory results were able to be obtained also in the current chopping tests and the break tests. In addition, in Working Examples 1 to 4, the Ti component dissolved in Cu was cross-sectionally analyzed, and it was confirmed that the Ti concentration thereof was 1 wt % or lower, and the conductivity was 20% IACS or higher. Therefore, it can be said that the electrical contacts of Working Examples 1 to 4 according to the present embodiment have improved conductivities, and thus can suppress the heat generation when energized.

Figure 7:
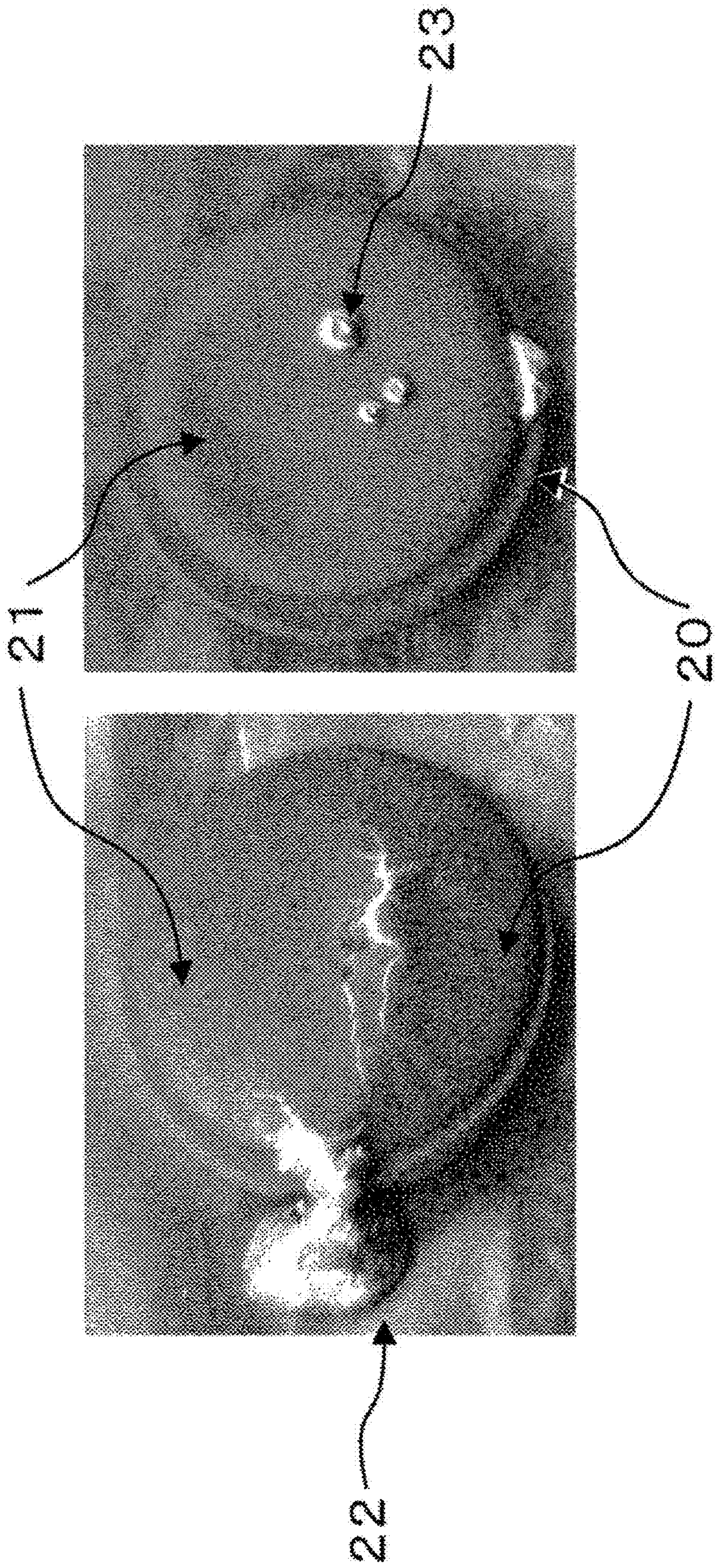
FIG. 7 is a photographic image showing a state of an electrical contact of Comparative Example 2 in Embodiment 1 of the present disclosure.
Figure 8:
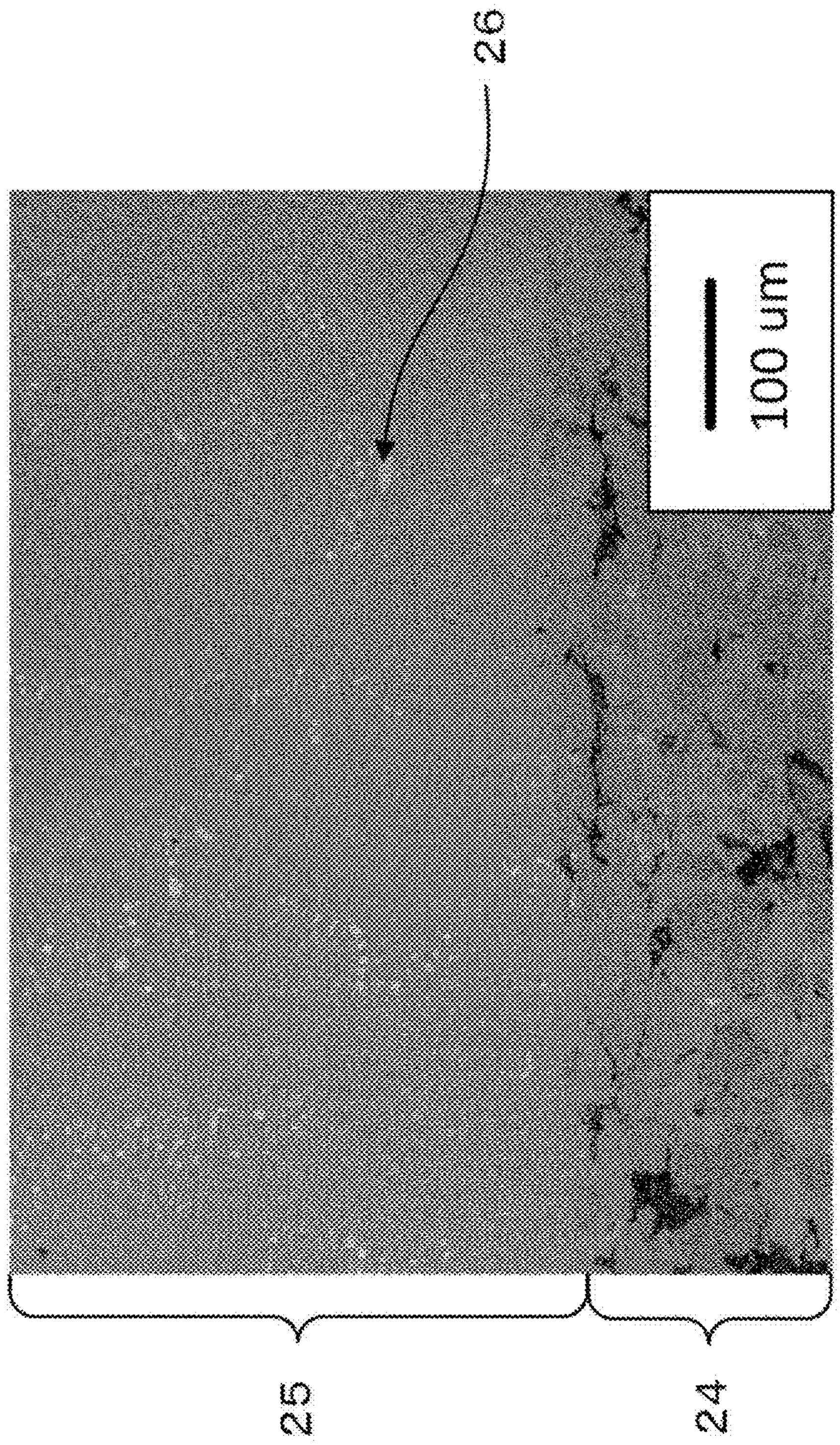
FIG. 8 is a SEM observation of a state in which Ti and its compound are precipitated in the infiltrant Cu that remains in Comparative Example 2.

Next, using FIG. 7 and FIG. 8, two reasons why Cu remains in Comparative Example 2 will be described. The first reason is the deterioration of the wettability between the sintered body and the infiltrant Cu due to the addition of Ti. FIG. 7 is a photographic image showing a state of the electrical contact of Comparative Example 2. From FIG. 7, it can be confirmed that there are the melted Cu 22 that does not infiltrate into the sintered body and thus flows out of it, the solidified Cu 23 that remains on the surface like a droplet, and the infiltrant Cu 21. It is considered, from FIG. 7, that when Ti is added excessively as in Comparative Example 2, the wettability between the sintered body and the infiltrant Cu deteriorates, so that some of the melted Cu cannot enter the sintered body and becomes a droplet to flow out.

The second reason is the increase in infiltration temperature due to the addition of Ti. FIG. 8 is a SEM observation of a state in which Ti and its compound are precipitated in the infiltrant Cu that remains in Comparative Example 2. In FIG. 8, the sintered body 24 and the infiltrant Cu 25 can be observed, and it can be seen that Ti 26 is sparsely present in the Cu 25. It is considered that since an amount of Ti that corresponds to Ti/Te of more than 0.12, which is required for the formation of the $Ti_3Te_4$ intermetallic compound, is added, Ti having a melting point of 1668 degrees Celsius, which is higher than the melting point of Cu of 1083 degrees Celsius, is present in the infiltrant Cu, thereby raising the melting point of the infiltrant to be higher than the melting point of regular Cu. In the present embodiment, from Working Example 4, it can be said that if Ti/Te is 0.38 or lower, it was possible to cause the infiltration to occur at an infiltration temperature up to 1140 degrees Celsius. To be more specific, in the present embodiment, from Working Examples 1 to 4 and Comparative Examples 1 to 2, it can be said that if Ti/Te is 0.38 or lower, it was possible to cause the infiltration to occur at an infiltration temperature up to 1140 degrees Celsius.

In Comparative Example 2, in order to sufficiently melt the infiltrant Cu with a raised melting point, the process was performed at a heating temperature of 1150 degrees Celsius. However, since also the Cu that was contained in the molded body melted, so that it was difficult to maintain the shape of the electrical contact. In addition, Te exists as an intermetallic compound with Ti, so that the melting point of Te is raised. However, the saturated vapor pressure of Te is very low, and therefore, if it is infiltrated at high temperature, part of Te may evaporate. Since evaporation of Te leads to a decrease in the density of the molded body, it was judged that the manufacture by processing it at 1150 degrees Celsius or higher is impossible. From the above, it was found that the addition of Ti in an amount that does not form $Cu_2Te$, which is a cause of fragility, is effective, whereas the addition of Ti more than necessary impairs the manufacturability of the electrical contact.

Next, Comparative Example 3 will be described. Comparative Example 3 has about the same Ti/Te as Working Example 3, while having Te concentration of 2.5 wt %. In Comparative Example 3, the infiltrated body has a density ratio of 95% or higher, and the Ti—Te intermetallic compound was confirmed to exist from the cross-sectional analysis. The result on the evaluation of the low chopping current characteristics obtained by using the vacuum switch tube for evaluation showed that the chopping current was greater than 1 A to fail the test. It is considered that this is because Te, which is a low boiling point metal for securing low surge characteristics, is insufficient. Therefore, it is considered that Te concentration of 3.5 wt % or higher is required to obtain the stable low chopping current characteristics.

From the Ti and Te state diagram shown in FIG. 6 as well as the results of Working Examples 1 to 4 and Comparative Examples 1 to 3 described above, it is considered that if the range of Ti/Te for generating the Ti—Te intermetallic compound is adjusted to 0.12 to 0.38, $TiTe_2$ or $Ti_3Te_4$ is generated. In particular, from the state diagram in FIG. 6, it is considered desirable that the range of Ti/Te is 0.17 to 0.3. To summarize the results shown in FIG. 2, in the electrical contacts that meet the requirements of the manufacturability, the low chopping current characteristics, and the conductivity, it can be said that Te concentration is 3.5 wt % or higher and Ti/Te is 0.12 to 0.38.

Next, the results of Working Examples 5 to 13 and Comparative Examples 4 to 8 will be described. As shown in FIG. 3, in Working Examples 5 to 9 and Comparative Examples 4 to 5, Te concentrations were fixed to 9 wt % and Ti/Te was varied within a range from 0.08 to 0.43.

In Working Examples 5 to 9, the infiltrated bodies with a density ratio of 95% or higher were able to be fabricated, and the machining was able to be performed without a problem. Also, the conductivity is 20% ACS, and both the low chopping current characteristics and the breaking characteristics were satisfactory. In Comparative Example 4, in which Ti/Te is lower than 0.09, the infiltrant Cu melted at 1110 degrees Celsius, whereas a large number of $Cu_2Te$ particles, which is a cause of fragility, was detected in the cross-sectional analysis and also cracks occurred during the machining. In Comparative Example 5, the infiltration was not sufficient at an infiltration temperature up to 1130 degrees Celsius. The cause of this is believed to be similar to that in Comparative Example 2. To summarize the results shown in FIG. 3, in the electrical contacts that meet the requirements of the manufacturability, the low chopping current characteristics, and the conductivity, it can be said that Te concentration is 9 wt % and Ti/Te is 0.12 to 0.37.

Next, the results of Working Examples 10 to 13 and Comparative Examples 6 to 8 will be described. As shown in FIG. 4, in Working Examples 10 to 13 and Comparative Examples 6 to 7, Te concentrations were fixed to 14.5 wt % and Ti/Te was varied within a range from 0.09 to 0.42. The results were the same as the results of Working Examples 1 to 9 and Comparative Examples 1 to 5 described above. Also, in Comparative Example 8, Te concentration was increased to 15.5 wt % in order to confirm the upper limit of Te concentration. In Comparative Example 8, although the fabrication of the electrical contact was possible, when the low chopping current characteristics and the breaking characteristics were tested, the amount of evaporation of Te, which is a low boiling point metal, was increased, and thus breaking failures were occasionally observed at 4 kA. Therefore, it is considered that the content of Te is practically lower than 15 wt %. To summarize the results shown in FIG. 4, in the electrical contacts that meet the requirements of the manufacturability, the low chopping current characteristics, and the conductivity, it can be said that Te concentration is 14.5 wt % and Ti/Te is 0.12 to 0.36.

Next, in order to examine the content of Cr, which is an arc resistant component, Working Examples 14 to 16 and Comparative Examples 9 to 10 were tested. The table in FIG. 9 shows the compositions and the test results of the electrical contacts in Working Examples 14 to 16 and Comparative Examples 9 to 10. In Working Examples and Comparative Examples in FIG. 9, Te concentrations were fixed to 9 wt %, Ti/Te was set to a constant value 0.29, and Cr concentrations were varied.

In Working Examples 14 to 16, the Ti—Te intermetallic compound was formed and the machining was able to be performed. In addition, in the evaluation of the low chopping current characteristics and the breaking characteristics, satisfactory results were obtained in common. There was a correlation between the Cr amount and the conductivity, in which the smaller the Cr amount is, the higher the conductivity tends to be. In FIG. 9, even Working Example 16, which has the highest Cr concentration of 60 wt % among Working Examples 14 to 16, was confirmed to have 20% IACS or higher.

In FIG. 9, in Comparative Example 9 with a Cr amount of 15 wt %, the break test at 4 kA was failed. From the cross-sectional analysis, it was confirmed that there was less high melting point substance Cr, which is an arc resistant component, and there was evidence of Cu welding. Therefore, it is considered that a small amount of Cr cannot make the electrical contact function. In FIG. 9, in Comparative Example 10 with a Cr amount of 70 wt %, it was difficult to form a molded body. This is because, due to the addition of Cr, which is hard, cracks, though which were slight, occurred on a side of the molded body when it was taken out from the press die. To summarize the results shown in FIG. 9, in the electrical contacts that meet the requirements of the manufacturability, the low chopping current characteristics, and the conductivity, it can be said that when Te concentration is 9 wt % and Ti/Te is 0.29, Cr concentration is 20 to 60 wt %.

Next, Working Examples 17 to 19 and Comparative Examples 11 to 12 were tested to examine the practical range of a Cr particle diameter. The table in FIG. 10 shows the compositions and the test results of the electrical contacts in Working Examples 17 to 19 and Comparative Examples 11 to 12 In Working Examples and Comparative Examples in FIG. 10, Te concentrations were fixed to 9 wt % and Ti/Te was set to a constant value 0.29, and the Cr particle diameters were varied.

In Working Example 17, in which the Cr particle diameter is 1 μm, the press molding was able to be performed. The press molding was able to be performed also in Working Examples 18 to 19. In Comparative Example 11, in which the Cr particle diameter is 0.1 μm, cracks occurred on a side of the molded body. It is considered that this is because the pressure at the time of molding becomes high in order to obtain a predetermined density of the molded body. In Comparative Example 12, in which the Cr particle diameter is 150 μm, the break tests were failed occasionally. It is considered that this is because if the particle diameter of the particles of Cr, which is a high melting point substance, is 150 μm or larger, the contact surface no longer has an even structure, and, as a result, the generated arc stays on the Cr particles of the high melting point substance. To summarize the results shown in FIG. 10, in the electrical contacts that meet the requirements of the manufacturability, the low chopping current characteristics, and the conductivity, it can be said that when Te concentration is 9 wt % and Ti/Te is 0.29, the practical Cr particle diameter is larger than 0.1 μm and not larger than 120 μm.

Further, Working Examples 20 to 22 were tested with the arc resistant component changed, for example, to W, $Cr_3C_2$, and WC, in which $Cr_3C_2$ is Cr carbide and WC is W carbide. FIG. 11 shows the compositions and the test results of the electrical contacts in Working Examples 20 to 22.

As shown in the results of FIG. 11, the same effect was obtained when the arc resistant component was changed to Cr carbide, W, and W carbide, instead of Cr. It is considered that this is because Cr carbide, W, and W carbide are high melting point metals and therefore have no problem as the arc resistant component in the practical use. Therefore, the particles of the high melting point substance are not limited to a Cr powder, but may be a W powder which is particles of another high melting point metal, or may be a $Cr_3C_2$ powder which is particles of the carbide of a high melting point metal such as Cr, or a WC powder, etc. which is particles of W carbide. That is, the particles of the high melting point substance should be particles made of at least one of a high melting point metal or a carbide of the high melting point metal. To give yet another example, a Mo powder can be used as the particles of the high melting point metal, as well as the Cr powder and the W powder, and also a $Mo_2C$ powder which is Mo carbide particles can be used as the particles of a carbide of the high melting point metal, as well as the $Cr_3C_2$ powder and the WC powder.

In the present embodiment, the electrical contact that can maintain high conductivity was fabricated by using Ti, instead of Mn, as an additive for maintaining the mechanical strength. From the test results of Working Examples and Comparative Examples above, it can be said that by adjusting Te concentration to 3.5 to 14.5 wt % and Ti/Te to 0.12 to 0.38, part of Ti forms $TiTe_2$ or $Ti_3Te_4$. As a result, $Cu_2Te$, which is a cause of fragility, is not formed, and thus the mechanical strength can be maintained. In addition, the electrical contact according to the present embodiment can satisfy the low chopping current characteristics and the breaking characteristics. That is, it is possible to fabricate an electrical contact that satisfies the breaking performance, the low surge characteristic ability, and the energizing performance for a large current.

The Cr concentration and the particle diameter can change depending on other conditions and the like. Therefore, as long as the Cr particle diameter is in a range that produces the effects described in the disclosure, the range of the Cr particle diameter is not limited to the range larger than 0.1 μm and 120 μm or smaller, obtained from Working Examples 1 to 19 and Comparative Examples 1 to 12.

DESCRIPTION OF REFERENCE NUMERALS AND SIGNS

10 fixed electrical contact
11 movable electrical contact
15 base material Cu
16 Cr
17 Ti—Te intermetallic compound
18 $TiTe_2$ intermetallic compound
19 $Ti_3Te_4$ intermetallic compound
22 melted Cu
23 solidified Cu

The invention claimed is:

1. An electrical contact comprising:
a base material made of Copper (Cu);
particles of a high melting point substance dispersed in the base material, the particles being made of at least one of a high melting point metal or a carbide of the high melting point metal; and
Tellurium (Te) and Titanium (Ti) dispersed in the base material, wherein
the Te of 3.5 to 14.5 has a mass %, and a ratio of the Ti to the Te is 0.12 to 0.38,
at least part of the Te and at least part of the Ti form an intermetallic compound of the Te and the Ti, and
the intermetallic compound is formed of $TiTe_2$ or $Ti_3Te_4$.

2. The electrical contact according to claim 1, wherein the Cu dissolves the Ti in an amount of 1 mass % or lower.

3. The electrical contact according to claim 2, wherein the particles of the high melting point substance are particles of at least one of Chromium (Cr), Cr carbide, Tungsten (W), W carbide, Molybdenum (Mo), and Mo carbide.

4. The electrical contact according to claim 2, wherein the particles of the high melting point substance are made of Chromium (Cr), a concentration of the Cr is 20 to 60 mass %, and a diameter of the particle of the Cr is larger than 0.1 μm and not larger than 120 μm.

5. The electrical contact according to claim 1, wherein the particles of the high melting point substance are particles of at least one of Chromium (Cr), Cr carbide, Tungsten (W), W carbide, Molybdenum (Mo), and Mo carbide.

6. The electrical contact according to claim 1, wherein the particles of the high melting point substance are made of Chromium (Cr), a concentration of the Cr is 20 to 60 mass %, and a diameter of the particle of the Cr is larger than 0.1 μm and not larger than 120 μm.

7. A vacuum switch tube comprising an electrical contact, the electrical contact comprising:
a base material made of Copper (Cu);
particles of a high melting point substance dispersed in the base material, the particles being made of at least one of a high melting point metal or a carbide of the high melting point metal; and
Tellurium (Te) and Titanium (Ti) dispersed in the base material, wherein
the Te of 3.5 to 14.5 has a mass %, and a ratio of the Ti to the Te is 0.12 to 0.38,
at least part of the Te and at least part of the Ti form an intermetallic compound of the Te and the Ti, and
the intermetallic compound is formed of $TiTe_2$ or $Ti_3Te_4$.

* * * * *